(12) United States Patent
Brown et al.

(10) Patent No.: US 6,728,842 B2
(45) Date of Patent: Apr. 27, 2004

(54) CACHE UPDATING IN MULTIPROCESSOR SYSTEMS

(75) Inventors: Jeffrey D. Brown, Rochester, MN (US); Steven R. Kunkel, Rochester, MN (US); David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 10/061,859

(22) Filed: Feb. 1, 2002

(65) Prior Publication Data

US 2003/0149846 A1 Aug. 7, 2003

(51) Int. Cl.$^7$ ............................................... G06F 12/00
(52) U.S. Cl. ..................................................... 711/146
(58) Field of Search ............................... 711/141, 145, 711/146, 121

(56) References Cited

U.S. PATENT DOCUMENTS 5,901,281 A * 5/1999 Miyao et al. ................. 714/11
6,014,709 A * 1/2000 Gulick et al. ............... 709/235
6,662,289 B1 * 12/2003 Ang ............................ 711/202

OTHER PUBLICATIONS

Handy, Jim. The Cache Memory Book. 1993. Academic Press. p. 151.*

* cited by examiner

Primary Examiner—Kevin Verbrugge
(74) Attorney, Agent, or Firm—Moser, Patterson & Sheridan L.L.P.

(57) ABSTRACT

Embodiments are provided in which cache update is implemented by using a counter table having a plurality of entries to keep track of different modified cache lines of a cache of a processor. If a cache line of the cache is modified by the processor and the original content of the cache line came from a cache of another processor, a counter in the counter table restarts and reaches a predetermined value (e.g., overflows) triggering the broadcast of the modified cache line so that the cache of the other processor can snarf a copy of the modified cache line. As a result, when the other processor reads from a memory address matching that of the cache line, the cache of the other processor already has the most current copy for the matching memory address to feed the processor. Therefore, a cache read miss is avoided and system performance is improved.

21 Claims, 5 Drawing Sheets

CACHE UPDATING IN MULTIPROCESSOR SYSTEMS

BACKGROUND OF THE INVENTION

1. Field of the Invention

The present invention generally relates to cache updating, and more particularly to cache updating in a shared-memory multiprocessor system.

2. Description of the Related Art

Users of data processing systems continue to demand greater performance for handling increasingly complex and difficult tasks. Greater performance from the processors that operate such systems may be obtained through faster clock speeds so the individual instructions are processed more quickly. However, processing speed has increased much more quickly than the speed of main memory. Despite the speed of a processor, a bottleneck on computer performance is that of transferring information between the processor and memory. Therefore, cache memories, or caches, are often used in many data processing systems to increase performance in a relatively cost-effective manner.

A typical cache comprises a cache data RAM (Random Access Memory), a cache directory RAM, bus buffers, and a cache controller. The cache data RAM is a small, fast memory which is used to store copies of data which could be accessed more slowly from main memory. The cache size is the number of bytes in the cache data RAM alone. The cache directory RAM contains a list of main memory addresses of data stored in corresponding locations of the cache data RAM. Accordingly, for each cache location, an address and data is stored, making the combined cache directory and cache data RAMs behave like a single, wide memory. The bus buffers are controlled in such a way that if the cache can supply a copy of a main memory location (this is called a cache hit), then the main memory is not allowed to send its data to the requesting CPU. If the cache does not contain a copy of the data requested by the CPU (this is called a cache miss), the bus buffers allow the address issued by the CPU to be sent to the main memory. The cache controller implements the algorithm which moves data into and out of the cache data RAM and the cache directory RAM.

The benefits of a cache are realized whenever the number cache hits are maximized relative to the number cache misses. Despite the added overhead that occurs as a result of a cache miss, as long as the percentage of cache hits is high (known as the "hit rate"), the overall processing speed of the system is increased. One method of increasing the hit rate for a cache is to increase the size of the cache. However, cache memory is relatively expensive and is limited by design constraints, particularly if the cache is integrated with a processor on the same physical integrated circuit.

Another method is to chain together multiple caches of varying speeds. A smaller but faster primary cache is chained to a relatively larger but slower secondary cache. Furthermore, instructions and data may be separated into separate data and instruction caches. Illustratively, some processors implement a small internal level one (L1) cache with an additional external level two (L2) cache, and so on.

Shared-memory multiprocessor systems present special issues regarding cache implementation and management. In a shared-memory multiprocessor system, all processors can access the main memory. This enables the tasks on all of the processors to efficiently and easily share data with one another. However, this sharing must be controlled to have predictable results. Conventionally, shared-memory multiprocessor systems have hardware that maintains cache coherency and provide software instructions that can be used to control which processor is storing to a particular memory location.

From the very creation of multiprocessor systems, the sharing of data in main memory has limited the scalability of both hardware and software. That is, it has limited the number of processors that could be effectively used in a multiprocessor system. As the number of processors in a multiprocessor system increases, the problem of limited scalability becomes worse. As a result, efficient hardware and software are needed.

Concerning hardware, most shared-memory multiprocessor systems use a snoop-invalidate cache protocol that allows a processor to store data to a memory location only if it has a modified copy of the cache line associated with the memory location. Other copies in other caches with a matching address are invalidated. This prevents multiple processors from storing to the line at once and keeps the system coherent.

In a shared-memory multiprocessor system, most writes to main memory by a processor modify only the processor's cache. The main memory will be updated with new data only when the modified cache line is evicted from the cache. Moreover, processors usually read data from main memory, operate on the read data, and write the result back to main memory. It is unlikely that a processor writes data to a main memory address and then reads back the data from the same main memory address. Therefore, in a large system with a large number of processors, the next processor to read and/or write to a memory location is often not the processor whose cache has the cache line associated with the memory location. This requires the cache line to be moved between the caches of different processors. Efficiently moving cache lines to other caches (i.e., cache update) is critical to multiprocessor systems.

On a shared-memory multiple processor system with 16 megabytes of level two (L2) cache per processor, about forty percent of the cache misses are due to reading and/or writing of shared data. Making the cache larger or adding additional levels of cache does not reduce the amount of cache misses. Instead, the result is the percentage of cache misses becomes larger with a larger cache and movement of the cache lines between caches reduces the performance of multiple processor systems.

Accordingly, there is a need for an apparatus and method in which cache updates are effectively carried out for a shared-memory multiprocessor system.

SUMMARY OF THE INVENTION

In one embodiment, a method is used for updating caches in a multiprocessor system having at least first and second processors coupled to a system bus, the first processor having a first cache and the second processor having a second cache. The method comprises, if a cache write hit occurs to a cache line in the first cache of the first processor and the cache line came from the second cache of the second processor, modifying a content of the cache line and broadcasting the modified content of the cache line on the system bus at a predetermined time after the content of the cache line is modified by the first processor.

In another embodiment, a computer system comprises a system bus and at least first and second processors coupled to the system bus, the first processor having a first cache and the second processor having a second cache. If a cache write hit occurs to a cache line in the first cache of the first processor and the cache line came from the second cache of the second processor, the first processor is configured to modify a content of the cache line and broadcast the modified content of the cache line on the system bus at a predetermined time after the content of the cache line is modified by the first processor.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments are provided in which cache update is implemented by using a counter table having a plurality of entries to keep track of different modified cache lines of a cache of a processor. If a cache line of the cache is modified by the processor and the original content of the cache line came from a cache of another processor, a counter in the counter table restarts and reaches a predetermined value (e.g., overflows) triggering the broadcast of the modified cache line so that the cache of the other processor can snarf a copy of the modified cache line. As a result, when the other processor reads from a memory address matching that of the cache line, the cache of the other processor already has the most current copy for the matching memory address to feed the processor. Therefore, a cache read miss is avoided and system performance is improved.

Figure 1:
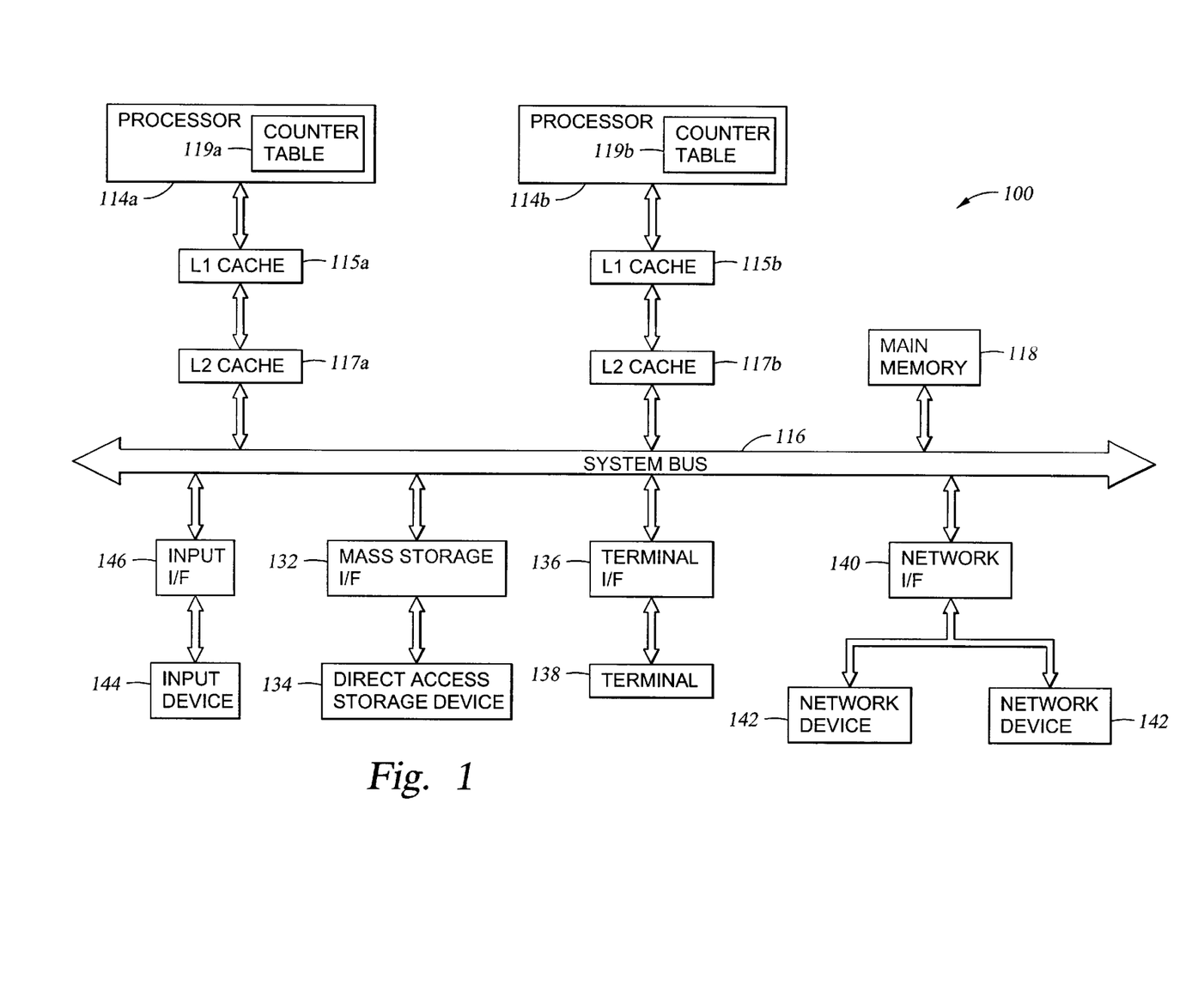
FIG. 1 shows a computer system 100 according to one embodiment.

FIG. 1 shows a computer system 100 according to one embodiment. Illustratively, the computer system 100 includes a system bus 116 and at least two processors 114a & 114b. The processor 114a comprises a counter table 119a and is coupled to the system bus 116 via an L1 cache 115a and an L2 cache 117a. The processor 114b comprises a counter table 119b and is coupled to the system bus 116 via an L1 cache 115b and an L2 cache 117b. The computer system 100 also includes an input device 144 coupled to system bus 116 via an input interface 146, a storage device 134 coupled to system bus 116 via a mass storage interface 132, a terminal 138 coupled to system bus 116 via a terminal interface 136, and a plurality of networked devices 142 coupled to system bus 116 via a network interface 140.

Terminal 138 is any display device such as a cathode ray tube (CRT) or a plasma screen. Terminal 138 and networked devices 142 may be desktop or PC-based computers, workstations, network terminals, or other networked computer systems. Input device 144 can be any device to give input to the computer system 100. For example, a keyboard, keypad, light pen, touch screen, button, mouse, track ball, or speech recognition unit could be used. Further, although shown separately from the input device, the terminal 138 and input device 144 could be combined. For example, a display screen with an integrated touch screen, a display with an integrated keyboard or a speech recognition unit combined with a text speech converter could be used.

Storage device 134 is DASD (Direct Access Storage Device), although it could be any other storage such as floppy disc drives or optical storage. Although storage 134 is shown as a single unit, it could be any combination of fixed and/or removable storage devices, such as fixed disc drives, floppy disc drives, tape drives, removable memory cards, or optical storage. Main memory 118 and storage device 134 could be part of one virtual address space spanning multiple primary and secondary storage devices.

The contents of main memory 118 can be loaded from and stored to the storage device 134 as processor 114 has a need for it. Main memory 118 is any memory device sufficiently large to hold the necessary programming and data structures of the invention. The main memory 118 could be one or a combination of memory devices, including random access memory (RAM), non-volatile or backup memory such as programmable or flash memory or read-only memory (ROM). The main memory 118 may be physically located in another part of the computer system 100. While main memory 118 is shown as a single entity, it should be understood that memory 118 may in fact comprise a plurality of modules, and that main memory 118 may exist at multiple levels, from high speed to low speed memory devices.

Figure 2:
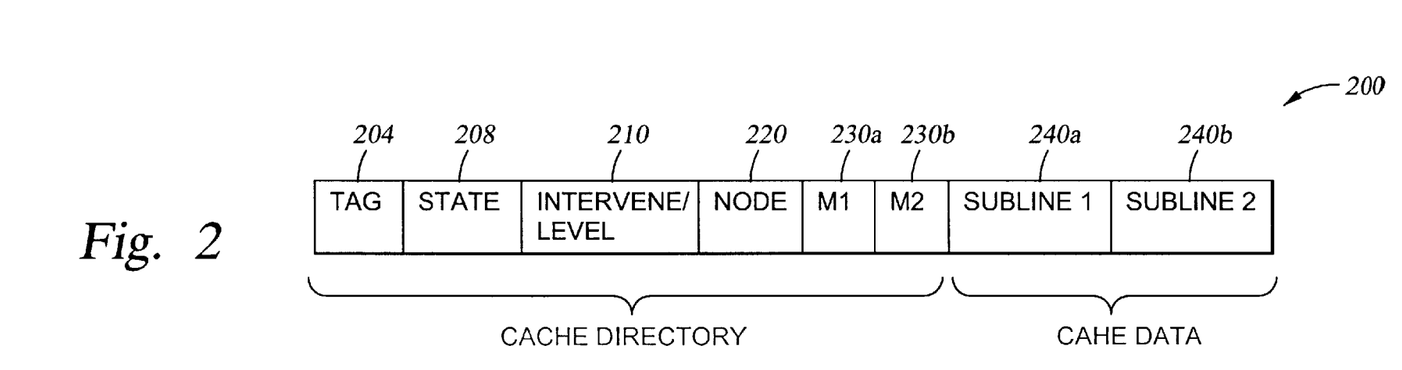
FIG. 2 shows one embodiment of a cache line 200 of the caches 115a, 115b, 117a, and 117b of FIG. 1.

FIG. 2 shows one embodiment of a cache line 200 of the caches 115a, 117a, 115b, and 117b of FIG. 1. The cache line 200 comprises a tag field 204, a state field 208, an intervene/level field 210, a node field 220, an M1 field 230a, an M2 field 230b, a subline field 240a, and a subline field 240b. The tag field 204 holds the tag bits of the memory address of the data contained in the subline fields 240a & 240b.

The content of the state field 208 indicates the state of the data in the subline fields 240a & 240b. In one embodiment, the state field 208 contains 2 bits specifying 4 different states of the data in the subline fields 240A & 240b. These four states are Invalid, Shared, Exclusive, and Modified. If the content of the state field 208 indicates that the data in the subline fields 240a & 240b is in Invalid state, the data in the subline fields 240a & 240b is invalid and should not be used for any purpose. If the content of the state field 208 indicates that the data in the subline fields 240a & 240b is in Shared state, the data in the subline fields 240a & 240b is most current and is also present in at least one other cache of another processor 114. The main memory 118 also holds valid data for the same address. If the content of the state field 208 indicates that the data in the subline fields 240a & 240b is in Exclusive state, the data in the subline fields 240a & 240b is most current and not present in any cache of any other processor 114. The main memory 118 also has a valid copy for the same address. If the content of the state field 208 specifies that the data in the subline fields 240a & 240b is in Modified state, the data in the subline fields 240a & 240b is most current and not present anywhere else in the system 100. Even the main memory 118 does not have a valid copy for the same address.

The content of the intervene/level field 210 indicates whether the data of the subline fields 240a & 240b should be broadcast and, if so, which level of caches 115 & 117 of other processors 114 should snarf a copy of the broadcast data of the subline fields 240a & 240b. In one embodiment, the intervene/level field 210 may hold a value of 0d (0 decimal; all numbers are binary except when expressly stated otherwise), 1d, or 2d. If the intervene/level field 210 contains a 0d, the data of the subline fields 240a & 240b should not be broadcast on the system bus 116 because the data was not from another processor 114 via intervention. In general, intervention occurs when a first processor provides a cache line to a second processor when the second processor incurs a cache read miss. If the intervene/level field 210 contains a 1d, this indicates the data of the subline fields 240a & 240b came from an L1 cache of another processor 114. Therefore, the data of the subline fields 240a & 240b should be broadcast on the system bus 116 and the L1 cache of the other processor 114 should snarf a copy of the data from the system bus 116. Similarly, if the intervene/level field 210 contains a 2d, this indicates the data of the subline fields 240a & 240b came from an L2 cache of another processor 114. Therefore, the data of the subline fields 240a & 240b should be broadcast on the system bus 116 and only the L2 cache 117 of the other processor 114 should snarf a copy of the data from the system bus 116.

The content of the node field 220 indicates whether the data of the subline fields 240a & 240b should be broadcast outside the current node. A node is loosely defined to be a group of processors 114 that has limited bandwidth and increased latency to other groups of processors 114. A node is implementation dependent. In one embodiment, the node field 220 can contain 0 or 1. If the node field 220 contains a 0, the data of the subline fields 240a & 240b should not be broadcast outside the current node. If the node field 220 contains a 1, the data of the subline fields 240a & 240b should be broadcast outside the current node.

If the intervene/level fields 210 contains a 0d, the contents of the M1 field 230a and M2 field 230b are not used. If the intervene/level fields 210 contains a nonzero value (i.e., 1d or 2d), the content of the M1 field 230a indicates whether the content of the subline field 240a should be broadcast. In one embodiment, the M1 field 230a may contain 0 or 1. If the M1 field 230a contains a 0, the content of the subline field 240a should not be broadcast. If the M1 field 230a contains a 1, the content of the subline field 240a should be broadcast. Similarly, if the intervene/level fields 210 contains a nonzero value (i.e., 1d or 2d), the content of the M2 field 230b indicates whether the content of the subline field 240b should be broadcast. In one embodiment, the M2 field 230b may contain 0 or 1. If the M2 field 230b contains a 0, the content of the subline field 240b should not be broadcast. If the M2 field 230b contains a 1, the content of the subline field 240b should be broadcast. In one embodiment, the width of the subline fields 240a & 240b is the same as that of the system bus 116 so that the data of one subline field 240 can be transferred on the system bus in one clock cycle. In another embodiment, there may be more or less than two subline fields 240 in the cache line 200.

Figure 3:
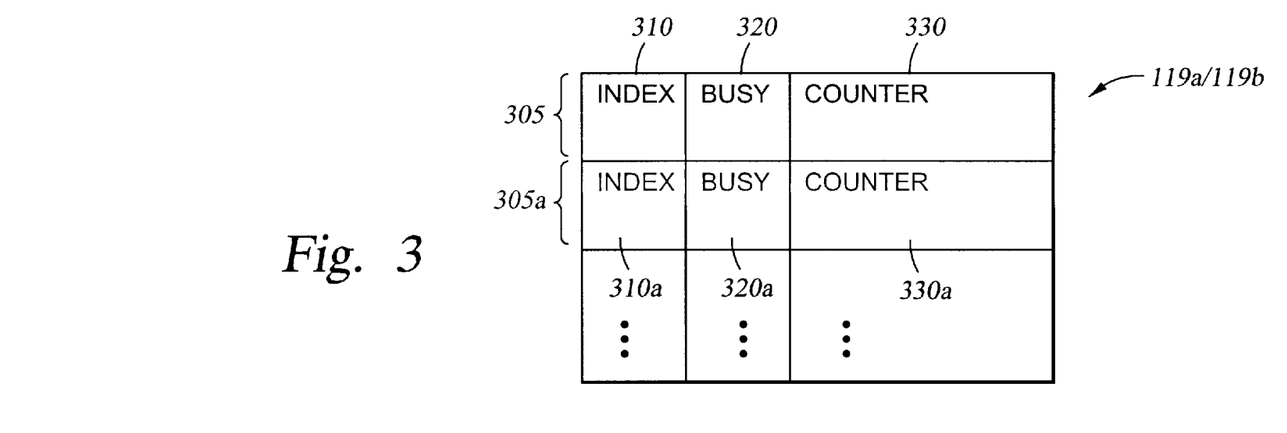
FIG. 3 shows one embodiment of the counter tables 119a and 119b of FIG. 1.

FIG. 3 shows one embodiment of the counter tables 119a and 119b of FIG. 1. In one embodiment, the counter table 119a/119b is implemented in hardware and includes a plurality of table entries 305. Each table entry 305 includes, illustratively, an index field 310, a busy field 320, and a counter 330. The content of the busy field 320 indicates whether the counter table entry 305 is currently associated with a cache line. If so, the content of index field 310 specifies which cache line the counter 330 is associated with. In general, the content of the counter 330 indicates how much time has passed since the counter table entry 305 was set up for the cache line. The counter 330 is designed to start from some value (referred herein as an initialization value) and overflow after a number of increments. Illustratively, the initialization value is zero. However, any value may be used and the counter 330 may count upwards or downwards from the initialization value. The overflow triggers broadcasting of the contents of the intervene/level field 210 and the subline fields 240 of the cache line 200 to other caches 115 & 117 in the system 100.

As an example, assume that the processor 114a reads from a memory address [56780H] and that the caches 115a & 117a of the processor 114a do not have any cache line for the memory address [56780H]. As a result, there is a cache read miss. Assume further that the processor 114b has the most current copy for the memory address [56780H] in one cache line of its L2 cache 117b, but not its L1 cache 115b. As a result, the L2 cache 117b provides a copy of the cache line to the caches 115a & 117a of the processor 114a via the system bus 116. Assume yet further that the data of the cache line copied to the caches 115a & 117a is 1234H. As a result, the data 1234H is written into the L1 cache 115a and the L2 cache 117a of the processor 114a. The state of the two newly updated cache lines in the caches 115a & 117a can be Shared. The intervene/level fields 210 of the two newly updated cache lines in the caches 115a & 117a are set to 2d (i.e., 2 decimal) to indicate that the data 1234 H is from the L2 cache 117b of another processor 114b via intervention.

Assume further that the processors 114a & 114b are in the same node. As a result, the node fields 220 of the two newly updated cache lines in the caches 115a & 117a of the processor 114a are set to 0.

Both the M1 and M2 fields 230a & 230b of the two newly updated cache lines in the caches 115a & 117a are set to 0 to indicate that the processor 114a has not modified the subline fields 240a & 240b. As a result, without any modification by the processor 114a, the contents of the subline fields 240a & 240b of the two newly updated cache lines in the caches 115a & 117a should not be broadcast to any other processor 114.

Assume further that the subline fields 240a & 240b of a cache line 200 are one byte wide and contain the most and least significant bytes of the data of the cache line 200. As a result, in the example above, for each of the two newly updated cache lines 200 in the caches 115a & 117a of the processor 114a, the subline fields 240a & 240b contain 12H and 34H, respectively.

Assume now that the processor 114a writes a one-byte value ABH into memory address [56780H]. Because the caches 115a & 117a of the processor 114a have the cache line for the address [56780H], there is a cache write hit. As a result, for the two newly updated cache lines 200 in the caches 115a & 117a of the processor 114a, the subline fields 240b change from 34H to ABH. The two newly updated cache lines 200 in the caches 115a & 117a of the processor 114a are hereafter referred to as the two newly written cache lines 200 in the caches 115a & 117a of the processor 114a.

Also as a result of the cache write hit, the content of the M2 fields 230b of the two newly written cache lines in the caches 115a & 117a are changed from 0 to 1. However, the contents of the M1 fields 230a, the intervene/level fields 210, and the node fields 220 of the two newly written cache lines in the caches 115a & 117a remain unchanged. Because the intervene/level fields 210 of the two newly written cache lines in the caches 115a & 117a contain 2d (a nonzero value), the initial content of the two newly written cache lines in the caches 115a & 117a came from an L2 cache 117 of another processor 114 via intervention. In addition, because the node fields 220 of the two newly written cache lines in the caches 115a & 117a contain 0, the initial content of the two newly written cache lines in the caches 115a & 117a came from a processor 114 in the same node. As a result, the new content ABH of the subline fields 240b of the two newly written cache lines 200 in the caches 115a & 117a should be broadcast to other processors 114 in the same node via the system bus 116. The content 2d of the intervene/level fields 210 of the two newly written cache lines is also broadcast on the system bus 116 so that only the L2 caches 117 of other processors 114 in the same node as the broadcasting processor snarf a copy of the data ABH for the matching address [56780H].

With the intervene/level fields 210 of the two newly written cache lines 200 in the caches 115a & 117a containing 2d, the cache write hit to memory address [56780H] changes the content of the M2 fields 230b of the two newly written cache lines from 0 to 1 to indicate that only the content ABH of the subline fields 240b should be broadcast. With the intervene/level fields 210 of the two newly written cache lines 200 in the caches 115a & 117a containing 2d (a nonzero value), the cache write hit to memory address [56780H] also triggers a search in the counter table 119a of processor 114a for a table entry 305 whose index field 310 contains 56780H. Assume there is no table entry 305 whose index field 310 contains 56780H. This triggers a search for an available table entry 305. Assume that the table entry 305a is available because its busy field 320a contains a 0. The content of the index field 310a of the counter table entry 305a is set to 56780H, which is the address of the two newly written cache lines in the caches 115a & 117a. The busy field 320a of the counter table entry 305a is set to 1 to indicate that the table entry 305a is not available. The counter 330a of the counter table entry 305a is triggered to start from 0 and count up one increment for every clock tick or a multiple of clock ticks.

In one embodiment, the size of the counters 330 of the counter table 119a/119b is designed to ensure that the counters 330 will overflow after a predetermined number of increments from an initialization value (illustratively 0). For instance, in order to make the counter 330 overflow after 8 clock ticks, the size of the counter 330 can be 3 bits wide. In one embodiment, the size of the counter 330 can be in a range of 8–12 bits wide so that the counter 330 overflows in a range of 256–4096 clock ticks. The optimum number of clock ticks that the counter 330 is allowed to run before overflowing depends on the application being executed and the system architecture. However, the optimum number of clock ticks that the counter 330 is allowed to run before overflowing can be determined via simulation.

In the example above, when the counter 330a overflows, it triggers a broadcast of content ABH of the subline 240b of the two newly written cache lines in the caches 115a & 117a on the system bus 116. Because the node fields 220 of the two newly written cache lines in the caches 115a & 117a contain 0, the broadcast of content ABH of the subline 240b of the two newly written cache lines is limited in the same node. Because the intervene/level fields 210 of the two newly written cache lines in the caches 115a & 117a contain 2d, only L2 caches 117 snarf a copy if they contain a cache line with matching address [56780H] (that is a snoop write hit). Because the L2 cache 117b of the processor 114b has a cache line for memory address [56780H], the L2 cache 117b snarfs a copy from the system bus 116 and changes the content of the subline field 240b from 34H to ABH. Later, when the processor 114b reads from memory address [56780H], no cache read miss occurs because the L2 cache 117b has a most current copy for the memory address [56780H]. As a result, the processor 114b operates relatively faster.

Figure 4:
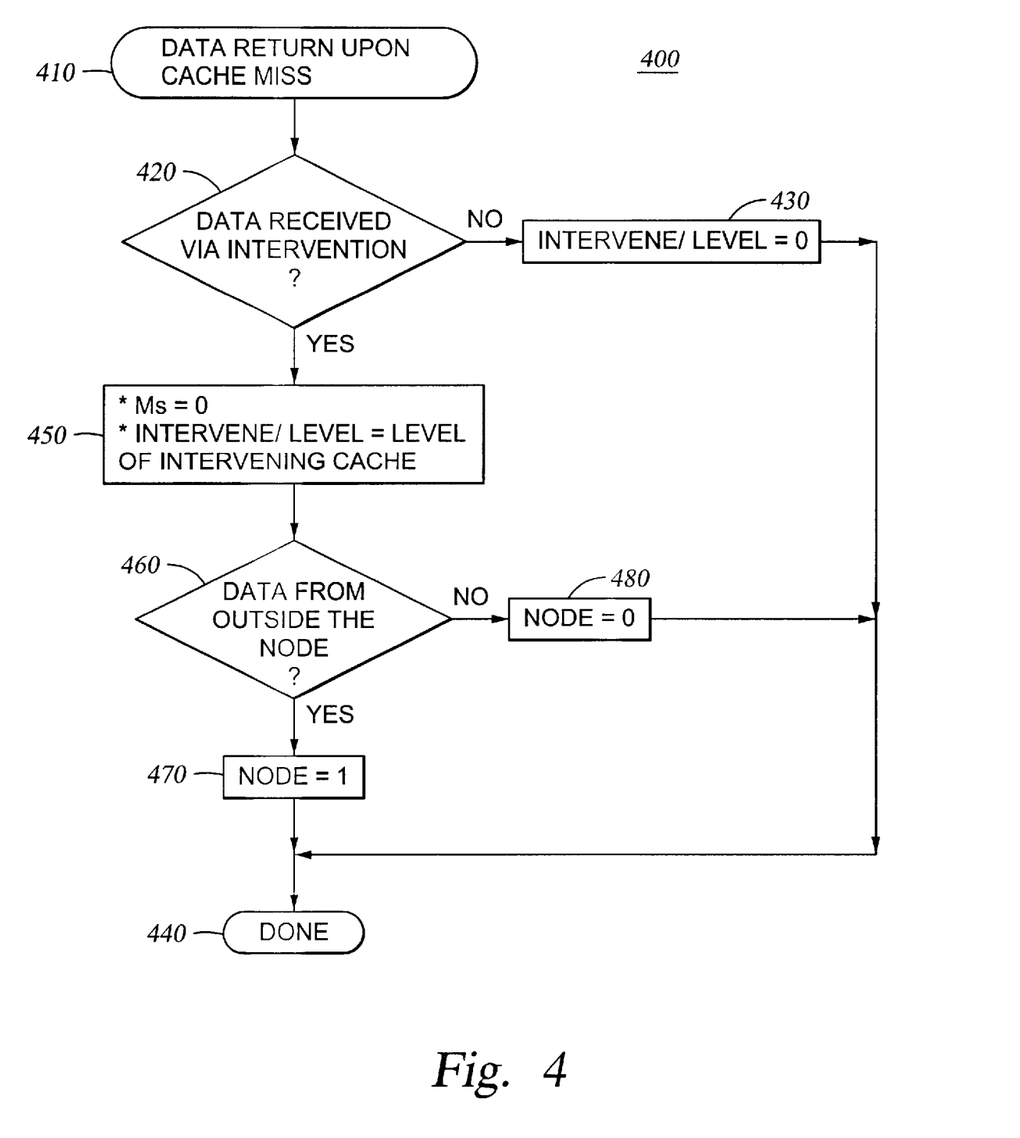
FIG. 4 shows one embodiment of the operations of the computer system 100 with respect to the intervene/level field 210, the node field 220, and the M1/M2 fields 230 of a cache line 200 in response to a cache miss.

FIG. 4 shows one embodiment of a method of operation 400 of the computer system 100 with respect to the intervene/level field 210, the node field 220, and the M1/M2 fields 230 of a cache line 200 in response to a cache miss. In step 410, upon a cache miss (read or write), data is provided to the sublines 240 of the cache line 200 in the cache 115 or 117 of the processor 114. In step 420, if the data is not from another processor 114 via intervention, the intervene/level field 210 of the cache line 200 is set to 0 in step 430 and the process is done in step 440. If the data is from another processor 114 via intervention, in step 450, the intervene/level field 210 of the cache line 200 is set to the level of the cache that provides the data via intervention. For instance, if only L2 cache 117 provides the data via intervention, the intervene/level field 210 of the cache line 200 is set to 2d. If both the L1 cache 115 and L2 cache 117 provide the data via intervention, the intervene/level field 210 of the cache line 200 is set to 1. Also in step 450, all the M fields 230 of the cache line 200 are reset to 0.

In step 460, if the data came from a processor 114 outside the node containing the cache 115 or 117 that has the cache line 200, the node field 220 of the cache line 200 is set to 1 in step 470 and the process is done in step 440. If the data came from a processor 114 within the node containing the cache 115 or 117 that has the cache line 200, the node field 220 of the cache line 200 is reset to 0 in step 480 and the process is done in step 440.

Relating the method 400 to the example above, the processor 114a suffers a cache read miss to address [56780H] in step 410 and receives data from the L2 cache 117b of processor 114b within the same node via intervention. As a result, in step 450, M1 and M2 fields of the cache line 200 are set to 0 and the intervene/level field 210 of the cache line 200 is set to 2d. In step 480, the node field 220 of the cache line 200 is set to 0.

Figure 5:
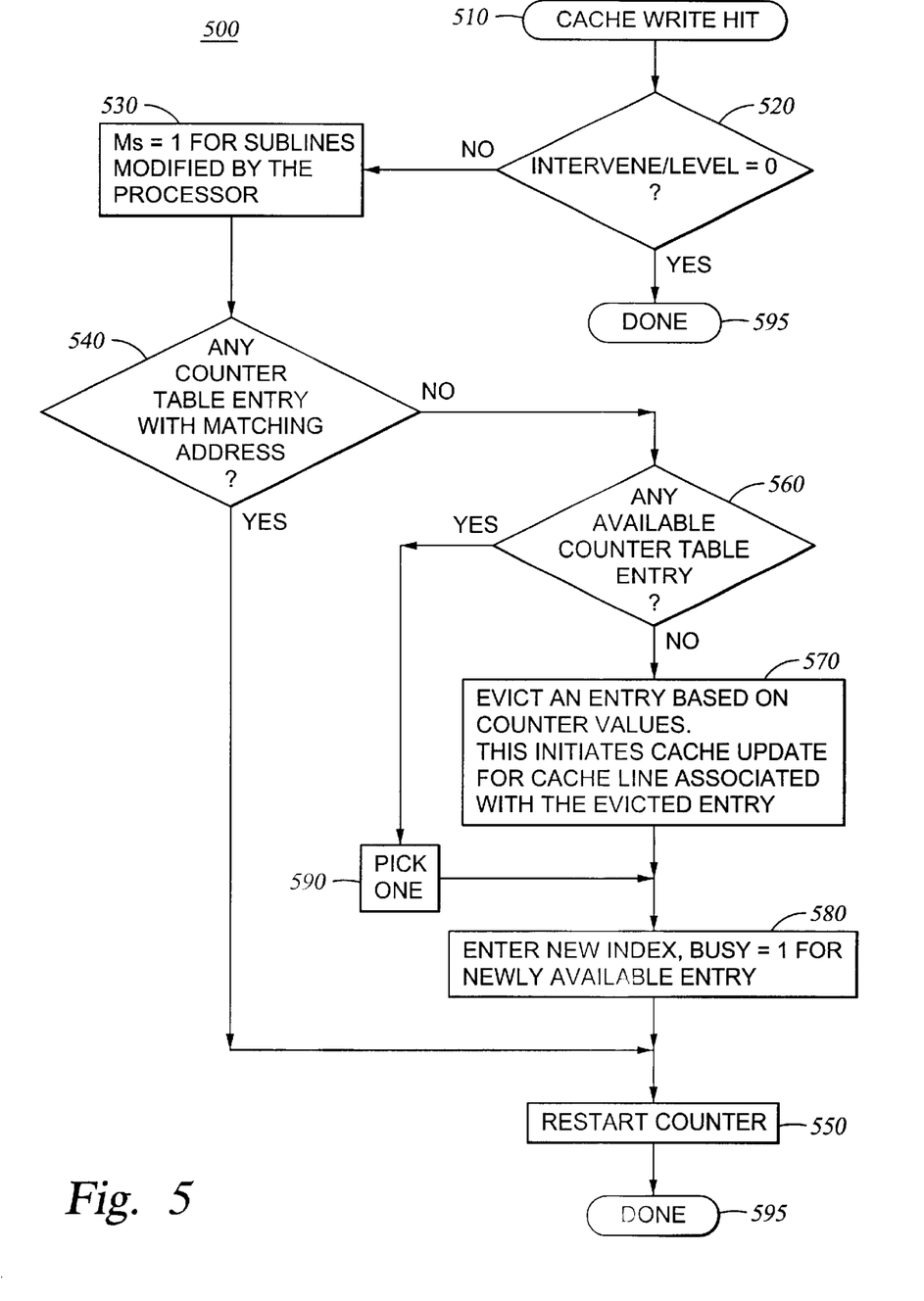
FIG. 5 shows one embodiment of the operations of the computer system 100 with respect to setting up an entry 305 in the entry table 119a/119b of FIG. 3 in response to a cache write hit.

FIG. 5 shows one embodiment of a method of operation 500 of the computer system 100 with respect to setting up an entry 305 in the entry table 119a/119b of FIG. 3 in response to a cache write hit. In step 510, a cache write hit occurs to a cache line 200 of the caches 115 or 117 of a processor 114. In step 520, if the intervene/level field 210 of the cache line 200 contains a 0, the process is done in step 595 with respect to setting up an entry 305 in the entry table 119a/119b of FIG. 3. In other words, no counter 330 needs to be set up for later broadcasting because the processor 114 does not need to broadcast anything. The reason is that the cache line 200 did not come from another processor 114 via intervention and therefore there is no need to set up a counter 330 in the counter table 119a/119b for a later broadcast of the cache line 200. On the other hand, if the intervene/level field 210 of the cache line 200 contains a non-zero, then in step 530, the M fields 230 of the cache line 200 are set to 1 only for the sublines 240 whose contents are modified by the processor 114 which owns the cache 115/117 containing the cache line 200.

In step 540, a decision is made as to whether there is a counter table entry 305 whose index field 310 contains the memory address of the newly written cache line 200. If there is none, in step 560, a decision is made as to whether there is any available counter table entry 305. A counter table entry 305 is available if its busy field 320 holds a 0. If there is no available counter table entry 305, then in step 570, a busy counter table entry 305 is evicted from the counter table 119a/119b. Evicted entry can be chosen based on the counter value its counter field 330. For instance, in one embodiment, a selection algorithm evicts an entry 305 with the highest counter value. The eviction of an entry 305 initiates a broadcast of the corresponding cache line whose address is held in the index field 310 of the evicted entry 305. In step 580, the newly available entry 305 will hold the address of the newly written cache line 200 and the busy field 320 is set to 1. In step 550, the counter 330 restarts from 0 and counts up for every clock ticks or multiple of clock ticks until it overflows triggering a broadcast of the cache line 200. The process is done in step 595.

If, in step 560, there is one or more available counter table entry 305 in the counter table 119a/119b, one of them is picked in step 590 and the process continues in step 580. If, in step 540, there is a counter table entry 305 whose index field 310 contains the memory address of the newly written cache line 200, the counter 330 of the counter table entry 305 is restarted from 0 in step 550.

In the example above, the processor 114a writes a one-byte value ABH into memory address [56780H] causing a cache write hit in step 510. In step 520, because the intervene/level field 210 of the newly written cache line 200 contains a 2d, the process continues in step 530. In step 530, only the M2 field 230b of the cache line 200 are set to 1 in step 530 because the processor 114a modifies only the subline 240b from 34H to ABH. In step 540, because in the counter table 119a there is no counter table entry 305 whose index field 310 contains the address [56780H] of the newly written cache line 200, the process continues to step 560. In step 560, because the counter table entry 305a is available, the process continues to steps 590 & 580. In step 580, the address [56780H] is put in the index field 310a of the counter table entry 305a and the busy field 320a is set to 1. In step 550, the counter 330a restarts from 0. The process is done in step 595.

Figure 6:
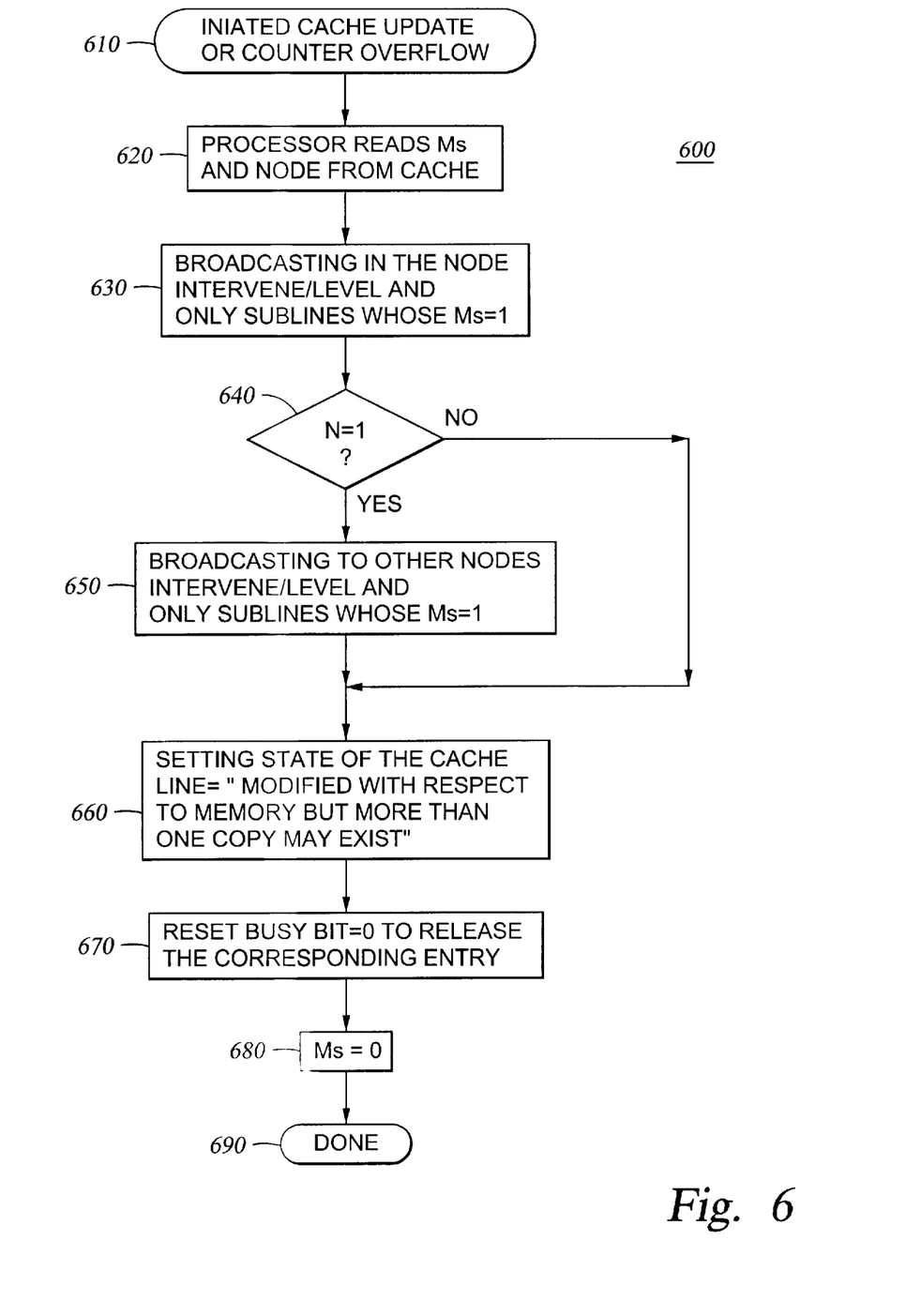
FIG. 6 shows one embodiment of the operations of the computer system 100 with respect to broadcasting a cache line some time after a cache write hit.

FIG. 6 shows one embodiment of a method of operation 600 of the computer system 100 with respect to broadcasting a modified cache line some time after a cache write hit. In step 610, the process starts with an initiated cache update (cache data broadcasting) as a result of step 570 of FIG. 5 or a counter overflow as a result of step 550 of FIG. 5. In step 620, the processor 114 associated with the newly written (modified) cache line 200 (whose entry 305 is evicted from counter table 119a/119b in step 570 or whose counter 330 overflows as a result of step 550) reads the M fields 230 and the node field 220 of the newly written cache line 200. In step 630, the contents of the intervene/level field 210 and the sublines 240 whose M fields 230 contain a 1 are broadcast to other processors 114 within the same node via the system bus 116. The sublines 240 whose M fields 230 contain a 0 are not broadcast. As a result, bus traffic on the system bus 116 is reduced.

In step 640, if the node field 220 of the newly written cache line 200 contains a 1, the contents of the sublines 240 whose M fields 230 contain a 1 are broadcast to other processors 114 in other nodes in step 650. Step 650 is skipped if the node field 220 of the newly written cache line 200 contains a 0. This is because the value 0 in the node field 220 of the newly written cache line 200 indicates it is likely that the processors 114 in other nodes do not need the content of the newly written cache line 200.

In step 660, the state of the cache line 200 can be updated to "Modified With Respect To Memory But More Than One Copy May Exist" or any other cache line state used in typical cache coherency protocols. In step 670, the busy field 320 of the counter table entry 305 is reset to 0 to indicate that the entry 305 is again available. In step 680, all the M fields 230 of the newly written cache line 200 are reset to 0, and the process is done in step 690.

In the example above, assume the counter table entry 305a is never evicted and the counter 330a overflows in step 610. The processor 114a reads the M1 and M2 fields 230a & 230b and the node field 220 from the newly written cache line 200 in step 620. In step 630, the processor 114a broadcasts content 2d of the intervene/level field 210 and only content ABH of the subline 240b to other processors 114 in the same node because the M1 field 230b contains a 1. Step 650 is skipped because the node field 220 contains a 0. In step 660, the state of the newly written cache line 200 in the caches 115a and 117a is set to "Modified With Respect To Memory But More Than One Copy May Exist" because processor 114b will get a copy of the newly written cache line 200. In step 670, the busy field 320a is reset to 0. In step 680, the M1 and M2 fields of the newly written cache line 200 are reset to 0. The process is done in step 690.

In the example above, when content 2d of the intervene/level field 210 and content ABH of the subline 240b of the newly written cache line 200 are broadcast in the same node on the system bus 116, the processor 114b, and any processor 114 in the system 100 which experiences a snoop write hit on the same address [56780H], snarfs a copy and update only its L2 cache 117b. As a result, the processor 114b has a most current copy (ABH) of the cache line for address [56780H] even though the processor 114b does not yet need the data. However, because initially the processor 114b sent the cache line to the processor 114a, it is likely that the processor 114b will need the cache line for the same address [56780H] in the near future. When the processor 114b does need the cache line, no cache read miss occurs because the cache line has the most current value in it. As a result, the processor 114b operates relatively faster and more effectively. In general, all processors 114 in the system 100 will operate relatively faster and more effectively, so the system performance is improved.

In one embodiment, each of the counter table entries 305 may include an age field whose content, instead of the counter value, can be used to select an entry 305 for eviction. In another embodiment, an extra cache line state may be added to distinguish the state of the newly written cache line 200 in the caches 115a & 117a of processor 114a with that of the snarfed cache line in the L2 cache 117b of the processor 114b. However, the embodiments described above can operate with any sets of cache line states of any cache coherency protocols.

While the foregoing is directed to embodiments of the present invention, other and further embodiments of the invention may be devised without departing from the basic scope thereof, and the scope thereof is determined by the claims that follow.

What is claimed is:

1. A method for updating caches in a multiprocessor system having at least a first processor and a second processor coupled to a system bus, the first processor having a first cache and the second processor having a second cache, the method comprising:

if a cache write hit occurs to a cache line in the first cache of the first processor and the cache line came from the second cache of the second processor, modifying a content of the cache line and broadcasting the modified content of the cache line on the system bus at a predetermined time after the content of the cache line is modified by the first processor.

2. The method of claim 1, wherein the step of broadcasting comprises:

starting a counter; and broadcasting the modified content of the cache line on the system bus when the counter reaches a predetermined value.

3. The method of claim 2, wherein the step of starting a counter comprises:

providing a counter table having a plurality of counter table entries, each of the counter table entries including a counter field and an index field for holding the address of a cache line;

selecting an available counter table entry and using its counter field as the counter; and starting the counter from an initialization value.

4. The method of claim 3, further comprising broadcasting the modified content of the cache line on the system bus if the counter table entry holding the counter of the cache line is evicted from the counter table.

5. The method of claim 1, wherein the step of broadcasting further comprises if the first and second processors are in the same node, broadcasting the modified content of the cache line within the node.

6. The method of claim 5, wherein the step of broadcasting comprises if the first and second processors are in different nodes, broadcasting the modified content of the cache line to all nodes.

7. The method of claim 1, further comprises putting a copy of the modified content of the cache line in all caches in the multiprocessor system that have the same cache level as that of the second cache and that experience a snoop write hit.

8. The method of claim 7, wherein the step of putting a copy of the modified content of the cache line comprises:

storing the cache level of the second cache in the cache line;

broadcasting the cache level on the system bus when the modified content of the cache line is broadcast on the system bus; and causing caches that have the same cache level as that of the second cache and that experience a snoop write hit as a result of the cache write hit to start a copy of the modified content of the cache line from the system bus.

9. The method of claim 1, wherein the step of broadcasting the modified content of the cache line on the system bus comprises broadcasting only modified sublines of the modified content of the cache line on the system bus.

10. The method of claim 9, wherein the step of modifying a content of the cache line comprises marking sublines of the cache line which are modified by the first processor; and the step of broadcasting only modified sublines comprises broadcasting only marked sublines of the cache line.

11. A computer system, comprising:

a system bus; and at least a first processor and a second processor coupled to the system bus, the first processor having a first cache and the second processor having a second cache; wherein if a cache write hit occurs to a cache line in the first cache of the first processor and the cache line came from the second cache of the second processor, the first processor is configured to modify a content of the cache line and broadcast the modified content of the cache line on the system bus at a predetermined time after the content of the cache line is modified by the first processor.

12. The computer system of claim 11, further comprising a counter configured to:

start counting when the content of the cache line is modified by the first processor; and trigger the first processor to broadcast the modified content of the cache line on the system bus when the counter reaches a predetermined value.

13. The computer system of claim 12, wherein the counter is in the first processor.

14. The computer system of claim 12, further comprising a counter table having a plurality of counter table entries, each of the counter table entries including a counter field and an index field for holding the address of a cache line, wherein the counter is implemented by a counter field of a counter table entry of the counter table.

15. The computer system of claim 14, wherein the counter table is configured to trigger the first processor to broadcast the modified content of a cache line on the system bus if the counter table entry containing the counter of the cache line is evicted from the counter table.

16. The computer system of claim 11, wherein if the first and second processors are in the same node, the first processor is further configured to broadcast the modified content of the cache line within the node.

17. The computer system of claim 16, wherein if the first and second processors are in different nodes, the first processor is further configured to broadcast the modified content of the cache line to all nodes.

18. The computer system of claim 11, wherein the first cache is configured to store the cache level of the second cache in the cache line and broadcast the cache level on the system bus when the modified content of the cache line is broadcast on the system bus.

19. The computer system of claim 18, wherein caches that have the same cache level as that of the second cache and that experience a snoop write hit as a result of the cache write hit are configured to snarf a copy of the modified content of the cache line from the system bus.

20. The computer system of claim 11, wherein the first cache is configured to broadcast only modified sublines of the modified content of the cache line on the system bus.

21. The computer system of claim 20, wherein the first processor is further configured to mark sublines of the cache line which are modified by the first processor; and the first cache is further configured to broadcast only marked sublines of the cache line.

* * * * *

UNITED STATES PATENT AND TRADEMARK OFFICE
CERTIFICATE OF CORRECTION

PATENT NO. : 6,728,842 B2 Page 1 of 1
DATED : April 27, 2004
INVENTOR(S) : Jeffrey D. Brown, Steven R. Kunkel and David A. Luick It is certified that error appears in the above-identified patent and that said Letters Patent is hereby corrected as shown below:

<u>Column 11</u>,
Line 52, "start" should be -- snarf --.

Signed and Sealed this

Thirteenth Day of July, 2004

JON W. DUDAS
*Acting Director of the United States Patent and Trademark Office*